United States Patent [19]

Giles, Jr. et al.

[11] Patent Number: 4,734,331

[45] Date of Patent: * Mar. 29, 1988

[54] MULTILAYER STRUCTURE HAVING AT LEAST ONE POLYCARBONATE LAYER

[75] Inventors: Harold F. Giles, Jr., Cheshire; Robert P. Hirt, Jr., Lenox, both of Mass.

[73] Assignee: General Electric Company, Mt. Vernon, Ind.

[*] Notice: The portion of the term of this patent subsequent to Aug. 26, 2003 has been disclaimed.

[21] Appl. No.: 853,566

[22] Filed: Apr. 18, 1986

Related U.S. Application Data

[63] Continuation of Ser. No. 688,196, Jan. 2, 1985, Pat. No. 4,608,311.

[51] Int. Cl.$^4$ .................. B32B 27/08; B32B 27/36
[52] U.S. Cl. ............................ 428/412; 428/516; 428/517; 428/520
[58] Field of Search .............. 428/412, 476.1, 520, 428/500, 515, 516, 62, 517, 35; 525/62

[56] References Cited

U.S. PATENT DOCUMENTS

| 3,585,177 | 6/1971 | Gardner et al. | 525/62 X |
|---|---|---|---|
| 4,058,647 | 11/1977 | Inoue et al. | 428/476.1 |
| 4,410,595 | 10/1983 | Matsumoto et al. | 428/412 |
| 4,608,311 | 8/1986 | Giles, Jr. et al. | 428/412 |

Primary Examiner—Thomas J. Herbert
Attorney, Agent, or Firm—Myron B. Kapustij; Martin B. Barancik

[57] ABSTRACT

A multilayer composition comprising at least one polycarbonate layer, at least one polyolefin layer, and at least one olefin vinyl alcohol layer, said layers being adhered together by means of tie layers containing a tie material selected from modified polyolefin graft copolymers and olefin vinyl ester copolymers.

36 Claims, No Drawings

MULTILAYER STRUCTURE HAVING AT LEAST ONE POLYCARBONATE LAYER

RELATED APPLICATIONS

This application is a continuation of copending application Ser. No. 688,196, filed Jan 2, 1985, now U.S. Pat. No. 4,608, 311.

BACKGROUND OF THE INVENTION

The use of multilayer compositions for containers such as bottles, jars and the like, and as packaging materials for storing food, beverages, and other perishable items has been known for quite some time. The concept of a multilayer structure is that the positive properties of two or more materials are combined with the structural integrity of each material being essentially uncompromised. Usually the advantageous and positive properties of one material off-set or counter-balance the weaker properties of the second material. Thus, for example, polycarbonate resins exhibit advantageous properties of excellent impact strength and heat resistance. However, polycarbonate resins generally exhibit relatively high permiability rates to water vapor and gas, such as oxygen and carbon dioxide, transport. On the other hand, there are known and available other polymeric materials which exhibit relatively good resistance to the transmission of water vapor. Still other known polymeric materials exhibit good resistance to the transport of gases such as oxygen and carbon dioxide. However these types of resins generally exhibit relatively poor resistance to impact and heat. Therefore, a multilayered structure can be hypothesized utilizing a polycarbonate resin layer in combination with one or more layers comprised of a polymeric material which is resistant to water vapor and/or gas transport. Such a structure should exhibit resistance to impact and heat as well as resistance to water vapor and/or gas transport.

Although such a multilayered structure can be hypothesized on the basis of laminating a material possessing certain strong properties with a material exhibiting weaknesses in those same properties, certain practical considerations inhibit implementation of this theory. The materials in the proposed laminar structure are in intimate contact at their interface. This juncture or interface should provide a sufficiently strong interaction with respect to the processing conditions which the multilayered structure undergoes so that a tight, firm and durable bond is maintained. Such conditions to which the multilayered structure can be exposed include heat, pressure, humidity, liquid chemicals, gasses and the like, or various combinations of these conditions. The propensity of the various layers to maintain this tight, firm and durable bond is generally known as the "compatibility" of these layers. When materials are incompatible the utility of the multilayer structure is severely inhibited or useless.

Aromatic polycarbonate resins are particularly useful for multilayer technology because of their high heat resistance, impact resistance, and clarity. However, polycarbonate resins are generally incompatible to varying degrees with a number of other resins.

It is an object of the instant invention to provide a multilayered structure which exhibits good resistance to impact and heat, resists water vapor transmission and gas transport, and in which the various layers or laminae maintain a tight, firm and durable bond.

SUMMARY OF THE INVENTION

The instant invention is directed to a multilayered structure comprised of at least one polycarbonate layer or ply, at least one olefin vinyl alcohol copolymer layer or ply, and at least one polyolefin layer or ply. These layers or plies are bonded together by means of appropriate relatively thin tie or adhesive layers.

DESCRIPTION OF THE INVENTION

In accordance with the instant invention there is provided a novel multilayer structure or laminate comprising at least one polycarbonate layer, at least one olefin vinyl alcohol copolymer layer, and at least one polyolefin layer, said layers tied or adhered together with a suitable tie layer disposed between said layers. In a preferred embodiment the polycarbonate and polyolefin layers comprise the outer layers and the olefin vinyl alcohol layer is an intermediate layer disposed between said polycarbonate and polyolefin layers and adhered thereto by means of suitable tie layers.

Aromatic polycarbonates are known materials which may be readily prepared by reacting a dihydric phenol with a carbonate precursor in an interfacial polymerization process or via transesterification. These high molecular weight thermoplastic polycarbonates are well known in the art and are disclosed, along with methods for their preparation, inter alia, in U.S. Pat. Nos. 2,999,835, 3,028,365, 3,275,601, 3,334,154 and 3,989,672, all of which are hereby incorporated herein by reference. Typical of some of the dihydric phenols which may be employed in the preparation of the polycarbonates are 2,2-bis(4-hydroxyphenyl)propane (bisphenol-A), 1,1-bis(4-hydroxyphenyl)propane, 2,2-bis(4-hydroxyphenyl)pentane, 2,2-bis(2-methyl-4-hydroxyphenyl)propane, 2,2-bis(2,6-dimethyl-4-hydroxyphenyl)propane, 2,2-bis(2,6-dibromo-4-hydroxyphenyl)propane, 1,1-bis(4-hydroxyphenyl)cyclohexane, 1,3-bis(4-hydroxyphenyl)propane, 4,4'-thiodiphenol, bis(3,5-diisopropyl-4-hydroxyphenyl)sulfone, p,p'-dihydroxydiphenyl, and bis(4-hydroxyphenyl)ether. Other useful dihydric phenols are disclosed in U.S. Pat. Nos. 2,999,835, 3,028,365, 3,334,154, 3,035,021, 3,036,036, 3,036,037, 3,036,038 and 3,036,039.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the carbonate polymers of the instant invention. Also employed in the practice of this invention may be blends of any of the above materials to provide the aromatic carbonate polymer.

The carbonate precursor may be either a carbonyl halide, a carbonate ester or a bishaloformate. The carbonyl halides which can be employed herein are carbonyl bromide, carbonyl chloride, and mixtures thereof. Typical carbonate esters which may be employed herein are diphenyl carbonate, di-(halo phenyl)carbonates such as di(chlorophenyl)carbonate, di(bromophenyl)carbonate, di(trichlorophenyl)carbonate, di(tribromophenyl)carbonate, etc., di(alkylphenyl) carbonates such as di(toyl)carbonate, etc., di(naphthyl) carbonate, di(chloronaphthyl)carbonate, phenyl tolyl carbonate, chlorophenyl chloronaphthyl carbonate, etc., or mixtures thereof. The bishaloformates suitable for use herein include the bishaloformates of dihydric phenols such as bischloroformate of hydroquinone, bischloroformate of bisphenol-A, and the like; or bishaloformates of glycols such as the bischloroformate of ethylene glycol, neopentyl glycol, polyethylene glycol, and the like. While other carbonate precursors will occur to those skilled in the art, carbonyl chloride, also known as phosgene, is the preferred carbonate precursor.

The aromatic polycarbonates useful in the practice of the instant invention may be prepared by employing a molecular weight regulator, an acid acceptor and a catalyst. The molecular weight regulators which may be employed include the monohydric phenols such as phenol itself, chroman-I, and paratertiarybutyl phenol.

A suitable acid acceptor may be either an organic or an inorganic acid acceptor. A suitable organic acceptor is a tertiary amine and includes such amines as pyridine, triethylamine, dimethylaniline, tributylamine, and the like. The inorganic acid acceptor may be one which can be a hydroxide, a carbonate, or phosphate of an alkali or alkaline earth metal.

The catalysts which are employed in the preparation of the carbonate polymers can be any of the suitable catalysts which aid the polymerization reaction of the dihydric phenols with the carbonate precursors. Suitable catalysts include, but are not limited to tertiary amines such as triethyl amine, tripropyl amine, N,N-dimethylaniline, quaternary ammonium compounds and quaternary phosphonium compounds.

Particularly useful polycarbonates are those containing recurring structural units represented by the general formula

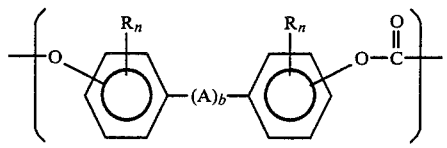

I.

wherein:
R is independently selected from halogen and monovalent hydrocarbon radicals,
A is selected from divalent hydrocarbon radicals,

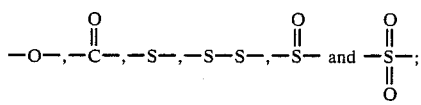

b is either zero or one; and
n is independently selected from positive integers having a value of from 0 to 4 inclusive.

The monovalent hydrocarbon radicals represented by R include alkyl, cycloalkyl, aryl, aralkyl and alkaryl radicals. The divalent hydrocarbon radicals represented by A include alkylene, cycloalkylene, alkylidene and cycloalkylidene radicals.

Also included herein are the branched polycarbonates which are obtained by the reaction of a dihydric phenol, a carbonate precursor, and a polyfunctional aromatic compound to provide a thermoplastic randomly branched carbonate polymer. These polyfunctional aromatic compounds are well known in the art and contain at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like.

Also included herein are blends of linear and branched polycarbonates.

Within the definition of aromatic polycarbonates are also copolyester-carbonates, that is the polymer derived from a dihydric phenol, a carbonate precursor, and an ester precursor such as a difunctional carboxylic acid or an acid halide. These copolyester-carbonates are disclosed in U.S. Pat. No. 3,169,121, which is hereby incorporated herein by reference.

The polyolefins, which comprise the second layer in the multilayer structure of the instant invention, are well known in the art and are generally commercially available. Typical of the polyolefins are polyethylene, polypropylene, polybutylene, polyisobutylene or any of the polyolefins derived from olefin monomers having from two to about 8 carbon atoms. Copolymers of the above may be employed and are included within the term polyolefin. Examples of copolymers include copolymers of ethylene and propylene or ethylene and butene. The term copolymers includes the usual copolymers, that is, random, random block, and block copolymers. Various densities of polyolefins can be employed in this invention and include high density polyethylene, linear low density polyethylene and low density polyethylene. The preferred polyolefin is polypropylene.

The olefin vinyl alcohol copolymers which comprise the third layer of the multilayer structure of the instant invention are known in the art and are disclosed, inter alia, in U.S. Pat. No. 3,585,177, which is hereby incorporated herein by reference. These olefin vinyl alcohol copolymers may be prepared by hydrolyzing olefin vinyl esters. The olefins used in the preparation of the olefin vinyl alcohols are the lower alpha olefins of from 2 to 4 carbon atoms, e.g., ethylene, propylene, butene-1 and isobutylene. Especially preferred is ethylene.

Suitable vinyl esters which can be copolymerized with the olefin monomers and subsequently hydrolyzed to form the olefin vinyl alcohol copolymers include vinyl ester monomers of the general formula:

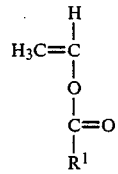

II.

wherein $R^1$ is selected from hydrogen, alkyl radicals of from 1 to about 10 carbon atoms, and aryl radicals of from 6 to 12 carbon atoms. Some illustrative non-limiting examples of these vinyl esters include vinyl formate, vinyl acetate, vinyl propionate, vinyl butyrate, and vinyl benzoate.

The preferred olefin vinyl alcohol copolymers are ethylene vinyl alcohol copolymers wherein the ethylene content is from 5 to 40 weight percent based on the weight of the copolymer. Especially preferred are ethylene vinly alcohol copolymers wherein the ethylene content is from 8.9 to 36.7 weight percent. Most especially preferred are ethylene vinyl alcohol copolymers wherein the ethylene content is from 12 to 29.8 weight percent.

The residual ester content of the copolymer should be less than 3% and preferably less than 2% by weight. Most preferably the ester content is less than 1% by weight. The preferred olefin vinyl alcohol copolymers contain less than 2% homopolymers, and preferably less than 1% homopolymers.

The term olefin vinyl alcohol copolymers also includes those copolymers containing a synthetic or natural rubber component such as butadiene, isoprene, natural rubbers, acrylonitrile-butadiene-styrene terpolymers, ethylene-propylene copolymers and terpolymers, chlorinated rubbers, and the like.

The tie layers joining the polycarbonate, olefin vinyl alcohol and polyolefin layers together may consist of any of the known adhesive materials which serve to bind or adhere these materials together and which are compatible with these materials. However, among these materials two types of materials are particularly preferred for use in the tie layers of the instant invention. The first type of these materials are the olefin vinyl ester copolymers. These olefin vinyl ester copolymers are well known in the art and are generally commercially available. These esters are prepared by the copolymerization of an olefin and a vinyl ester. The olefins used in the preparation of the olefin vinyl esters are the lower alpha olefins of from 2 to 4 carbon atoms. An especially preferred olefin is ethylene.

The vinyl esters which can be copolymerized with the olefins are the vinyl ester monomers of Formula II. A particularly useful vinyl ester is vinyl acetate.

The preferred tie layers of this type are those comprised of ethylene vinyl acetate copolymers. Especially preferred ethylene vinyl acetate copolymers are those wherein the acetate content is from about 15 to about 35 percent based on the weight of the copolymer.

The second type of material which functions as an effective tie layer in the instant invention is a modified polyolefin containing 0.01–10 weight percent of an unsaturated carboxylic acid or anhydride component. The polyolefins used in the tie layer include homopolymers of alpha-olefins such as ethylene and propylene and copolymers of ethylene and other alpha olefins such as ethylene-propylene copolymers, ethylene-butene-1 copolymers, ethylene-hexane-1 copolymers and copolymers of alpha-olefins such as propylene-butene-1 copolymers.

These homopolymers and copolymers can be used as a blended mixture. The unsaturated carboxylic acids and anhydrides thereof include acrylic acid, methacrylic acid, maleic acid, fumaric acid, itaconic acid, 3,6-endomethylene tetrahydro phthalic acid and anhydrides thereof. It is especially preferable to use acrylic acid acid or maleic anhydride. The modified polyolefins can be produced by graft-polymerizing said unsaturated carboxylic acid or anhydride to a polyolefin.

The graft-polymerization can be carried out by a method of melt blending a polyolefin and said unsaturated carboxylic acid or anhydride with a catalyst in an extruder; or a method of mixing said unsaturated carboxylic acid or anhydride and a catalyst with a suspension of polyolefin in a medium and heating the mixture with stirring.

The modified polyolefin should contain an unsaturated carboxylic acid component in an amount of 0.01 to 10 weight percent so as to give desirable adhesive strength.

These modified polyolefins may be blended with 40-3 weight percent of a rubber component having a Mooney viscosity 50 $ML_{1+4}$ (100° C.) of 40–150 preferably 40–100 in accordance with ASTM D15. The typical rubber components include natural rubber and synthetic rubbers such as styrene-butadiene rubber, acrylonitrile-butadiene rubber, acryl rubber, urethane rubber, butyl rubber, chloroprene rubber, silicone rubber, polybutadiene rubber, ethylene-propylene rubber, and the like. The preferred rubbers are the ethylene-propylene rubber and ethylene-propylene terpolymer having a third component of ethylidenenor-bornene.

These modified polyolefins are described in more detail in U.S. Pat. No. 4,058,647, which is hereby incorporated herein by reference.

The multilayer structures can be readily prepared by standard techniques, including co-extrusion through a feedblock or combination in the die. The thickness of the layers may vary substantially and are obviously somewhat dependant upon the final use to which the multilayer structure will be applied. Generally the polycarbonate, olefin vinyl alcohol, and polyolefin layers have a thickness of from about 0.10 mil to about 80 mils each. These layers preferably have a thickness of from about 0.25 to about 60 mils each, and more preferably from about 0.5 mil to about 30 mils. The tie layers are usually significantly thinner than the polycarbonate, olefin vinyl alcohol, and polyolefin layers. The thickness of the tie layers is a thickness which is effective to adhere or bond the polycarbonate, olefin vinyl alcohol, and polyolefin layers together. Generally this thickness is less than about 1 mil, although tie layers up to about 5 mils thick can be employed.

The multilayer structures of the instant invention contain at least one polycarbonate layer, at least one olefin vinyl alcohol layer, and at least one polyolefin layer. These layers are adhered together by means of a thin tie layer of the aforedescribed adhesive materials interposed between each of these layers. In the instant multilayer structure the polycarbonate, olefin vinyl alcohol, and polyolefin layers need not be arranged in any particular manner. Thus, for example, in a three layer structure containing one polycarbonate layer, one olefin vinyl alcohol layer, and one polyolefin layer bonded together by a tie layer interposed intermediate each of these layers the polycarbonate layer may be adjacent to and bonded to either the olefin vinyl alcohol layer or the polyolefin layer; the olefin vinyl alcohol layer may be adjacent to and bonded to either the polycarbonate layer or the polyolefin layer; or the polyolefin layer may be adjacent to and bonded to either the polycarbonate or the olefin vinyl alcohol layer. That is to say, in a three layer structure the polycarbonate and the polyolefin layers may be the outer layers and the olefin vinyl alcohol layer may be the inner layer disposed intermediate said polycarbonate and polyolefin outer layers; the polycarbonate and the olefin vinyl alcohol layers may be the outer layers and the polyolefin layer may be the inner layer disposed intermediate said polycarbonate and olefin vinyl alcohol outer layers; or the olefin vinyl alcohol and polyolefin layers may be the outer layers and the polycarbonate layer may be the inner layer disposed intermediate said polyolefin and olefin vinyl alcohol outer layers.

In the multilayer structures of the instant invention the tie layers may be the same or they may be different. Thus, for example, in a three layer structure containing two tie layers both of these tie layers may be the same or one tie layer may be comprised of one of the preferred aforedescribed materials while the second tie layer is comprised of a different material.

The multilayer structure may comprise a simple laminate useful, for example, as a tray or can be thermoformed or blow-molded into a variety of structures including containers of various types.

A particularly useful multilayer structure of the instant invention is a three layer structure comprised of a polycarbonate outer layer, a polyolefin outer layer, and an olefin vinyl alcohol inner layer disposed intermediate said polycarbonate and polyolefin outer layers and bonded thereto by tie layers disposed intermediate said inner layer and said two outer layers.

In preparing the laminates or containers of the instant invention there can be significant wastage of the multilayer material. An example of such material is the scrap material prepared when the pinch-off is made in coextrusion blow molding. A further example of such material is containers of the multilayer material which have outlived their usefulness. These multilayer scrap materials are reground thus forming blends of their components. The polycarbonate, polyolefin, and olefin vinyl alcohol layers are a major portion of the blends while the tie layers are a minor portion of the blends. Generally, the polycarbonate, polyolefin, and olefin vinyl alcohol constitute above about 70 weight percent of the blends, preferably above about 85 weight percent of the blends. The tie materials constitute below about 30 weight percent of the blends, preferably below about 15 weight percent of the blends. Weight percent of the blends, as regards the tie material and the polycarbonate, polyolefin, and olefin vinyl alcohol is determined based on the total amounts of the tie material and the polycarbonate, polyolefin, and olefin vinyl alcohol present in the blends.

Generally, the instant blends contain:
(i) from about 5 to about 96 weight percent polycarbonate;
(ii) from about 1 to about 60 weight percent olefin vinyl alcohol;
(iii) from about 2 to about 85 weight percent polyolefin; and
(iv) from about 0.5 to about 25 weight percent of at least one tie material selected from the olefin vinyl esters and the modified polyolefins described hereinafore.

Preferred blends comprise:
(i) from about 10 to about 85 weight percent polycarbonate;
(ii) from about 1 to about 30 weight percent olefin vinyl alcohol;
(iii) from about 5 to about 80 weight percent polyolefin; and
(iv) from about 1 to about 20 weight percent of at least one tie material selected from olefin vinyl esters and modified polyolefins.

The compositions of the instant invention may optionally contain organic or inorganic inert fillers. The fillers which may be used are preferably particulate fillers such as particulate glass, e.g., chopped glass fiber, glass rovings, glass microbaloons or microspheres, and pulverulent glass, clay, talc, mica, inorganic natural fibers, synthetic organic fibers, alumina, graphite, silica, calcium carbonate, carbon black, magnesia, and the like. Generally such fillers are added to reinforce the structural integrity of the composition, e.g., to inhibit sagging and/or improve the tensile strength and stiffness of the composition and also to reduce shrinkage, minimize crazing, and lower material costs. Generally the amount of filler employed in the compositions of the instant invention is in the range of from about 2 to about 60 weight percent, preferably from about 5 to about 50 weight percent, and especially from about 8 to about 30 weight percent based on the combined weight of the components (i)–(iv) and the filler.

The compositions of the instant invention may also optionally contain an impact modifier to improve the impact properties of the compositions. Generally these impact modifiers are quite well known in the art and serve to upgrade the impact properties of polymers such as polycarbonates. Examples of these impact modifiers include, but are not limited to, the following general categories:
 polyacrylates;
 polyolefins;
 rubbery dienic polymers; and
 styrenic polymers.

The polyacrylates which may be employed as impact modifiers are rubbery homopolymers or copolymers. In general the polyalkyl acrylates described in Brinkman et al., U.S. Pat. No. 3,591,659, incorporated herein by reference, can be used, especially those containing units derived from alkyl acrylates, particularly n-butyl acrylate. Acrylate containing copolymers wherein the other monomer is, for example, derived from a methacrylate are also readily employable, see for example Japanese Patent Application Announcement No. 1968-18611, incorporated herein by reference. Preferably the acrylate resin will be in the form of a rubber-elastic graft copolymer having a glass transition temperature below about $-20°$ C., preferably below about $-40°$ C. Schlichting, U.S. Pat. No. 4,022,748, incorporated herein by reference. More preferably, the acrylate resin will comprise a multiple stage polymer having a rubbery first stage (core) and a thermoplastic hard final stage (shell), see Farnham U.S. Pat. No 4,096,202, incorporated herein by reference.

The most preferred acrylate resin is a multi-phase composite interpolymer comprised of a $C_1$–$C_5$ acrylate and a $C_1$–$C_5$ methacrylate. These interpolymers consist of about 25 to 95 weight percent of a first elastomeric phase polymerized from a monomer system comprising about 75 to 99.8 weight percent of a $C_1$–$C_5$ alkyl acrylate, 0.1 to 5 weight percent of cross linking monomer, 0.1 to 5 weight percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, a first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer Acryloid KM-330 available from Rohm and Haas is preferred. This interpolymer is comprised of small quantities of crosslinking and graft monomers, about 80 weight percent n-butyl acrylate and about 20 weight percent methyl methacrylate.

The polyolefins which can be employed as impact modifiers are homopolymers or copolymers. Examples of homopolymers include polyethylene, polypropylene, polybutene-1, polyhexene and the like. The polymers include the standard high density polymers, low density polymers as well as the new linear low density polyolefins such as the linear low density polyethylene made with butene-1 or octene-1. Other examples of copolymers containing at least one olefin monomer can be employed. For example, copolymers of ethylene and propylene can be employed as the impact modifier as well as a copolymer of an olefin and an acrylate such as ethylene ethyl acrylate, a copolymer available from Union Carbide as DPD-6169. Other higher olefin monomers can be employed as copolymers with alkyl acrylates, for example propylene and n-butyl acrylate and the like. These polyolefin polymers can also be reacted with rubbery dienes so as to form terpolymers of the EPDM family such as ethylene propylene diene terpolymers, for example Epsyn 704 available from Copolymer Rubbber.

Various rubbery polymers can also be employed as impact modifiers. Examples of such rubbery polymers include polybutadiene, polyisoprene, styrene-butadiene and various other copolymers having a rubbery dienec comonomer.

Styrene containing polymers also can be employed as impact modifiers. Examples of such polymers include acrylonitrile-butadiene-styrene, styrene acrylonitrile, acrylonitrile-butadiene-alpha-methylstyrene, methacrylate-butadiene-styrene and other high impact styrene containing polymers.

Other known impact modifiers include various elastomeric materials such as organic silicone rubbers, organic silicone polysiloxane polymers, polysiloxane-polycarbonate block copolymers, elastomeric fluorohydrocarbons, elastomeric polyesters, and the like.

Generally any minimum quantity of impact modifier which positively upgrades the impact strength of the compositions of the instant invention can be employed. Greater than this minimize quantity may be employed so long as the properties desired for a particular application of these compositions are substantially maintained. Generally a minimum of about two weight percent is sufficient to observe an increase in the impact strength. A minimum of about four weight percent is preferred. A level of about 30 weight percent should generally not be exceeded, preferably about 20 weight percent. Weight percent is measured as the amount of impact modifier in the total of impact modifier plus the components (i)-(iv) of the instant compositions.

The instant compositions can be injection molded into various parts and utilized wherein an aromatic polycarbonate can be employed. A molded article with greater environmental stress resistance as well as easier processability is formed.

Generally the amounts of components (i)-(iv) will depend upon the thicknesses and number of the various layers, including the tie layers, present in the multilayer structure from which the instant blends are formed. Component (iv) depends upon whether only one tie material is present in the multilayer structure or two different tie materials are utilized, i.e., two different tie layers are present. Component (iv) is present in minor amounts while components (i)-(iii), in combination, are present in major amounts in the instant blends.

The multilayered structures of the instant invention exhibit the toughness and impact resistance of polycarbonate structures, and also exhibit improved resistance to water vapor and gas transport. They are, therefore, quite useful as packaging for foodstuffs, medicines, and other perishable items.

DESCRIPTION OF THE PPEFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis unless otherwise indicated.

The following examples illustrate the blends of the instant invention.

EXAMPLE 1

A mixture of pellets comprised of 10 weight percent polycarbonate[1] pellets, 74 weight percent polypropylene[2] pellets, 9 weight percent ethylene vinyl alcohol[3] pellets, and 7 weight percent of ethylene vinyl acetate[4] pellets is prepared by blending the pellets together and physically mixing them for 5 minutes. This mixture is then fed to an extruder operating at a temperature of 450°–500° F. The extruded strands are chopped into pellets and the pellets are injection molded at 460°–480° F. into standard test bars.

[1] Bisphenol-A polycarbonate, IV in methylene chloride at 25° C. of 0.53–0.56 from General Electric.
[2] Shell homopolymer 5550.
[3] EVAL-F from Kurare
[4] CXA E-136 from Dupont These test bars are subjected to a variety of tests to determine their physical properties. These tests include ASTM D648, Heat Distortion Temperature Under Load (DTUL); Flexural Strength and Flexural Modulus, ASTM D790; Notched Izod Impact Strength (NI), ASTM D256; and Gardner Impact Strength. The results of these tests are set forth in Table I.

EXAMPLE 2

The procedure of Example 1 is substantially repeated except the mixture contains 22 weight percent polycarbonate, 65 weight percent polypropylene, 9 weight percent ethylene vinyl alcohol, and 4 weight percent ethylene vinyl acetate.

EXAMPLE 3

The procedure of Example 1 is substantially repeated except that the mixture contains 63 weight percent polycarbonate, 20 weight percent polypropylene, 10 weight percent ethylene vinyl alcohol, and 7 weight percent ethylene vinyl acetate.

The following examples illustrate the blends of the instant invention which additionally contain an impact modifier.

EXAMPLE 4

The procedure of Example 1 is substantially repeated except that the resin mixture is admixed with 10 parts per hundred parts of resin of an EPDM type impact modifier marketed by the Good Year Company under the designation EPDM 847G-9.

EXAMPLE 5

The procedure of Example 1 is substantially repeated except that the resin mixture is admixed with 20 parts per hundred parts of resin of EPDM 847G-9.

EXAMPLE 6

The procedure of Example 1 is substantially repeated except that the resin mixture is admixed with 30 parts per hundred parts of resin of EPDM 847G-9.

EXAMPLE 7

The procedure of Example 1 is substantially repeated except that the resin mixture is admixed with 5 parts per hundred parts of resin of ethylene ethyl acrylate

EXAMPLE 8

The procedure of Example 1 is substantially repeated except that the resin mixture is admixed with 10 parts per hundred parts of resin of ethylene ethyl acrylate

EXAMPLE 9

The procedure of Example 1 is substantially repeated except that the resin mixture is admixed with 15 parts per hundred parts of resin of ethylene ethyl acrylate.

The following examples illustrate the blends of the instant invention which additionally contain a filler.

EXAMPLE 10

The procedure of Example 1 is substantially repeated except that the resin mixture is admixed with 10 parts per hundred parts of resin of talc.

EXAMPLE 11

The procedure of Example 1 is substantially repeated except that the resin mixture is admixed with 20 parts per hundred parts of resin of talc.

EXAMPLE 12

The procedure of Example 1 is substantially repeated except that the resin mixture is admixed with 30 parts per hundred parts of resin of talc.

EXAMPLE 13

The procedure of Example 1 is substantially repeated except that the resin mixture is admixed with 40 parts per hundred parts of resin of talc.

EXAMPLE 14

The procedure of Example 1 is substantially repeated except that the resin mixture is admixed with 10 parts per hundred parts of resin of $CaCO_3$.

EXAMPLE 15

The procedure of Example 1 is substantially repeated except that the resin mixture is admixed with 20 parts per hundred parts of resin of $CaC_3$.

EXAMPLE 16

The procedure of Example 1 is substantially repeated except that the resin mixture is admixed with 30 parts per hundred parts of resin of $CaCO_3$.

EXAMPLE 17

The procedure of Example 1 is substantially repeated except that the resin mixture is admixed with 40 parts per hundred parts of resin of $CaCO_3$.

EXAMPLE 18

The procedure of Example 1 is substantially repeated except that the resin mixture is admixed with 15 parts per hundred parts of resin of mica.

EXAMPLE 19

The procedure of Example 1 is substantially repeated except that the resin mixture is admixed with 30 parts per hundred parts of resin of mica.

EXAMPLE 20

The procedure of Example 1 is substantially repeated except that the resin mixture is admixed with 45 parts per hundred parts of resin of mica.

EXAMPLE 21

The procedure of Example 1 is substantially repeated except that the resin mixture is admixed with 10 parts per hundred parts of resin of 3/16" long fiberglass.

EXAMPLE 22

The procedure of Example 1 is substantially repeated except that the resin mixture is admixed with 20 parts per hundred parts of resin of 3/16" long fiberglass.

EXAMPLE 23

The procedure of Example 1 is substantially repeated except that the resin mixture is admixed with 30 parts per hundred parts of resin of 3/16" long fiberglass.

EXAMPLE 24

The procedure of Example 21 is substantially repeated except that the fiberglass is ¼" long.

EXAMPLE 25

The procedure of Example 22 is substantially repeated except that the fiberglass is ¼" long.

TABLE I

| Example No. | Notched Izod (⅛") ft. lb./in. | Gardner Impact in. lbs. | DTUL °C. at 264 psi. | Flexural Properties | | Tensile Properties | |
|---|---|---|---|---|---|---|---|
| | | | | modulus (psi × 10⁵) | strength (psi × 10³) | yield (psi × 10³) | failure (psi × 10³) |
| 1 | 0.4 | 12 | 57 | 1.85 | 6.17 | 5.02 | 1.86 |
| 2 | 0.5 | <8 | 66 | 2.17 | 6.53 | — | — |
| 3 | 2.4 | <8 | 102 | 2.57 | 8.40 | — | — |
| 4 | 0.7 | 30 | 51 | 1.78 | 5.16 | — | — |
| 5 | 1.5 | 170 | 46 | 1.50 | 4.24 | — | — |
| 6 | 8.8 | >320 | 51 | 1.21 | 3.29 | — | — |
| 7 | 0.6 | 23 | 45 | — | — | — | — |
| 8 | 0.7 | 58 | 51 | — | — | — | — |
| 9 | 0.8 | 58 | 46 | — | — | — | — |
| 10 | 0.4 | 12 | 62 | 2.08 | 6.13 | 3.95 | 3.65 |
| 11 | 0.5 | <8 | 64 | 2.50 | 6.44 | 3.90 | 3.73 |
| 12 | 0.4 | <8 | 70 | 3.25 | 6.17 | 3.70 | 3.51 |
| 13 | 0.4 | <8 | 66 | 3.88 | 5.73 | — | — |
| 14 | 0.5 | 12 | 54 | 2.11 | 5.92 | 3.92 | 3.70 |
| 15 | 0.5 | 12 | 55 | 2.48 | 6.04 | — | — |
| 16 | 0.5 | 12 | 60 | 2.95 | 5.98 | 3.63 | 3.48 |
| 17 | 0.4 | <8 | 57 | 3.26 | 5.81 | — | — |
| 18 | 0.5 | <8 | 61 | 2.56 | 6.14 | 3.83 | 3.62 |
| 19 | 0.5 | <8 | 77 | 4.47 | 6.06 | 3.57 | 3.47 |
| 20 | 0.4 | <8 | 83 | 7.06 | 5.4 | — | — |
| 21 | 1.0 | <8 | 121 | 3.39 | 7.54 | — | 5.61 |
| 22 | 1.4 | <8 | 130 | 5.20 | 9.42 | — | 7.10 |
| 23 | 1.6 | <8 | 133 | 7.59 | 11.4 | — | — |
| 24 | 1.0 | <8 | 99 | 3.27 | 6.72 | 4.82 | 4.59 |
| 25 | 1.1 | <8 | 106 | 5.29 | 7.65 | 5.39 | 5.29 |

EXAMPLE 26

A five layer sheet, using ethylene vinyl acetate CXA E-136) as the tie layer was prepared by coextrusion. The sheet had the following structure:

polycarbonate/ethylene vinyl acetate/ethylene vinyl alcohol/ethylene vinyl acetate/polypropylene.

The thickness of the various layers, in mils, was as follows:

1.3/1.3/3.1/1.6/8.5.

The processing conditions used were as follows:

| | Extruder temperatures (°F.) | | | |
|---|---|---|---|---|
| | polycarbonate | ethylene vinyl alcohol | polypropylene | tie layer |
| Zone 1 | 500 | 400 | 510 | 360 |
| Zone 2 | 520 | 410 | 530 | 380 |
| Zone 3 | 530 | 420 | 540 | 410 |
| Zone 4 | 540 | 430 | 540 | — |
| Adapter temp. | 550 | 430 | 540 | 410 |

The die temperature was 500° F. and the feed block temperature was 450° F.

The adhesion of the layers in the sheet was good.

What is claimed is:

1. A multilayer structure comprising:
   (i) at least one polycarbonate layer;
   (ii) at least one olefin vinyl alcohol layer; and
   (iii) at least one unmodified polyolefin layer;
   said layers being adhered together by means of tie layers disposed therebetween said tie layers being comprised of an olefin vinyl ester copolymer.
2. The structure of claim 1 wherein said unmodified polyolefin is polypropylene.
3. The structure of claim 1 wherein said olefin vinyl alcohol is ethylene vinyl alcohol.
4. The structure of claim 3 wherein said unmodified polyolefin is polypropylene.
5. The structure of claim 1 wherein said polycrbonate contains at least one recurring structural unit represented by the formula

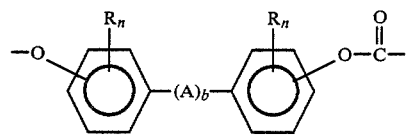

wherein
R is independently selected from monovalent hydrocarbon radicals and halogen radicals,
A is selected from divalent hydrocarbon radicals, —O—, —S—, —S—S—,

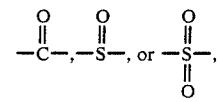

b is either zero or one, and
n is independently selected from integers having a value of from 0 to 4 inclusive.
6. The structure of claim 5 wherein b is one.
7. The structure of claim 6 wherein A is a divalent hydrocarbon radical.
8. The structure of claim 7 wherein said divalent hydrocarbon radicals is 2,2-propylidene.
9. The structure of claim 8 wherein n is zero.
10. The structure of claim 1 wherein said olefin vinyl ester copolymer is an olefin vinyl acetate copolymer.
11. The structure of claim 10 wherein said olefin vinyl acetate copolymer is ethylene vinyl acetate copolymer.
12. The structure of claim 11 wherein said olefin vinyl alcohol is ethylene vinyl alcohol.
13. the structure of claim 12 wherein said unmodified polyolefin is polypropylene.
14. The structure of claim 1 which contains one polycarbonate layer, one unmodified polyolefin layer, and one olefin vinyl alcohol layer adhered together by means of said olefin vinyl ester copolymer tie layers.

15. The structure of claim 14 wherein said olefin vinyl alcohol layer is an intermediate layer disposed between a polycarbonate outer layer and an unmodified polyolefin outer layer and is adhered to said outer layers by means of said olefin vinyl ester copolymer tie layers.

16. A multilayer structure comprising:
(i) at least one polycarbonate layer;
(ii) at least one olefin vinyl alcohol layer; and
(iii) at least one unmodified polyolefin layer;
said layers being adhered together by means of ties layers disposed therebetween, said tie layers consisting essentially of a modified polyolefin copolymer.

17. The structure of claim 16 wherein said unmodified polyolefin is polypropylene.

18. The structure of claim 16 wherein said modified polyolefin copolmer is a graft copolymer of a polyolefin and a carboxylic acid or a carboxylic anhydride.

19. The structure of claim 18 wherein said polyolefin portion of said modified polyolefin copolymer is a polymer derived from at least the alpha-olefin.

20. The structure of claim 19 wherein said alpha-olefim is selected from ethylene, propylene, or mixtures thereof.

21. The structure of claim 18 wherein said carboxylic acid is selected from acrylic acids and methacrylic acids.

22. The structure of claim 21 wherein said carboxylic acid is acrylic acid.

23. The structure of claim 18 wherein said carboxylic anhydride is maleic anhydride.

24. The structure of claim 16 wherein said olefin vinyl alcohol is ethylene vinyl alcohol.

25. The structure of claim 24 wherein said unmodified polyolefin is polypropylene.

26. The structure of claim 16 wherein said polycarbonate contains at least one recurring structural unit represented by the formula

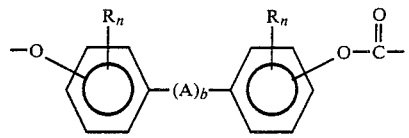

wherein
R is independently selected from monovalent hydrocarbon radicals and halogen radicals,
A is selected from divalent hydrocarbon radicals, —O—, —S—,

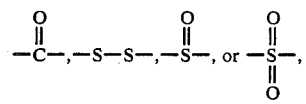

b is either zero or one, and
n is independently selected from integers having a value of from 0 to 4 inclusive.

27. The structure of claim 26 wherein b is one.

28. The structure of claim 27 wherein A is a divalent hydrocarbon radical.

29. The structure of claim 28 wherein said divalent hydrocarbon radical is 2,2-propylidene.

30. The structure of claim 29 wherein n is zero.

31. The structure of claim 16 which contains one polycarbonate layer, one unmodified polyolefin layer, and one olefin vinyl alcohol layer adhered together by means of said modified polyolefin copolymer tie layers.

32. The structure of claim 31 wherein said olefin vinyl alcohol layer is an intermediate layer disposed between a polycarbonate outer layer and an unmodified polyolefin outer layer and is adhered to said outer layers by means of said modified polyolefin copolymer tie layers.

33. A multilayer laminar structure consisting essentially of:
(i) at least one polycarbonate layer;
(ii) at least one olefin vinyl alcohol layer; and
(iii) at least one unmodified polyolefiin layer; said layers being adhered together by means of tie layers disposed therebetween.

34. The structure of claim 33 wherein said unmodified polyolefin is polypropylene.

35. The structure of claim 33 wherein said olefin vinyl alcohol is ethylene vinyl alcohol.

36. the structure of claim 35 wherein said unmodified polyolefin is polypropylene.

* * * * *